April 18, 1933.  P. GARMS ET AL  1,904,130
THREAD TESTING AND RECORDING DEVICE
Filed Feb. 26, 1932   3 Sheets-Sheet 1
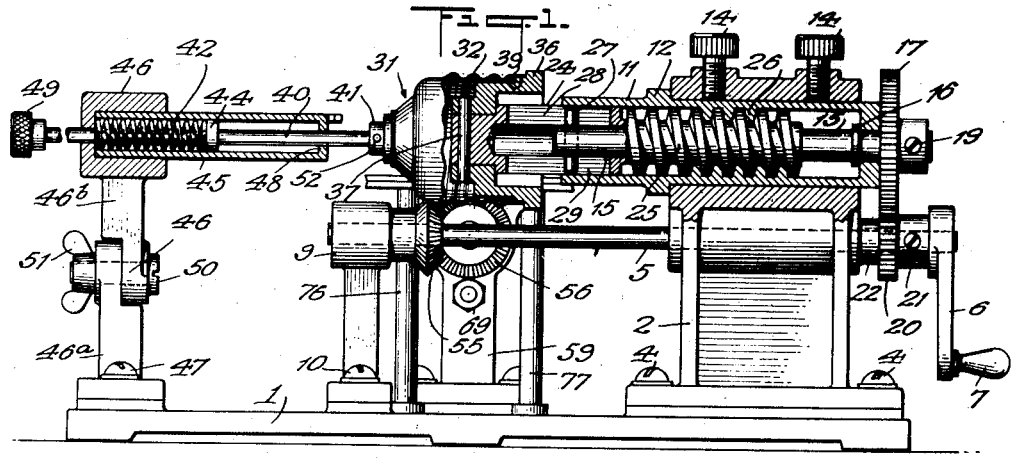
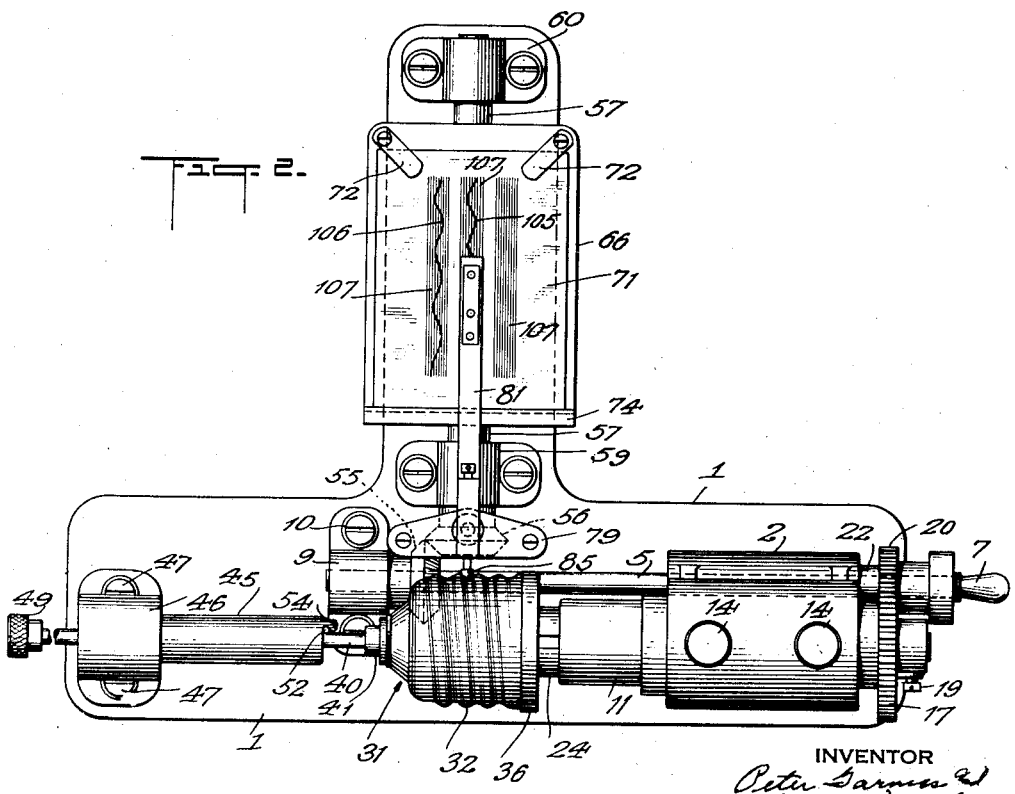
INVENTOR
Peter Garms
George L. Siggles
BY Williams, Rich & Morse
THEIR ATTORNEYS

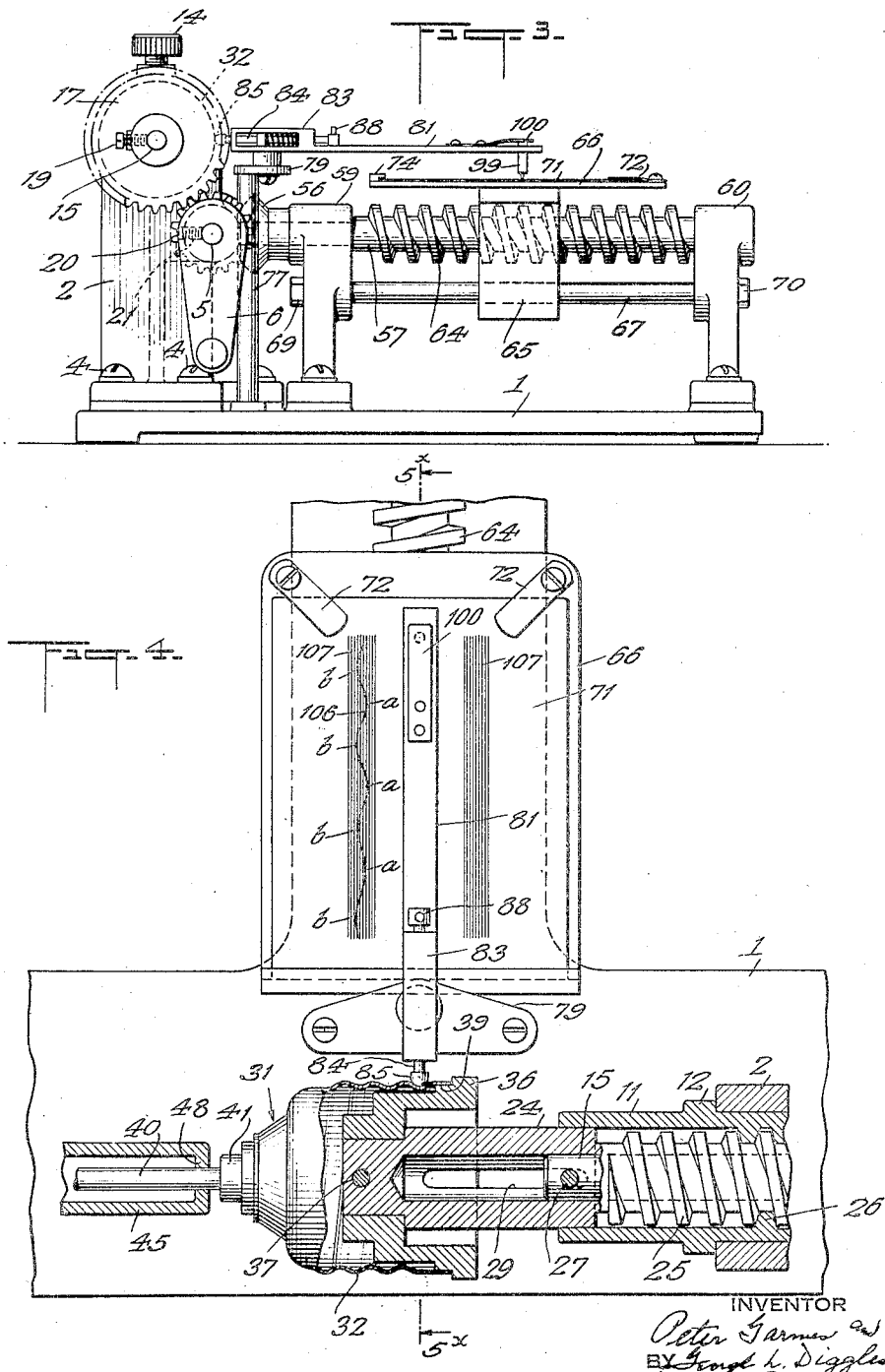

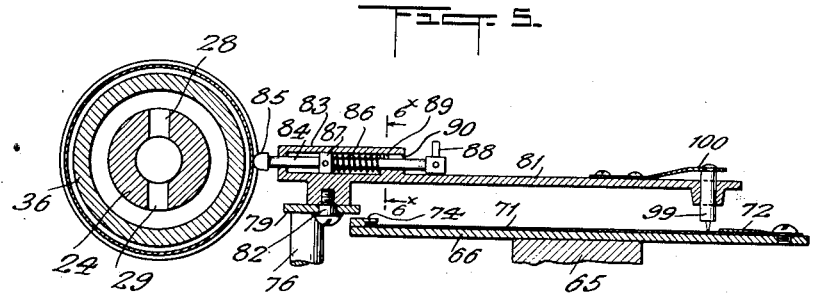
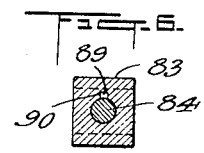
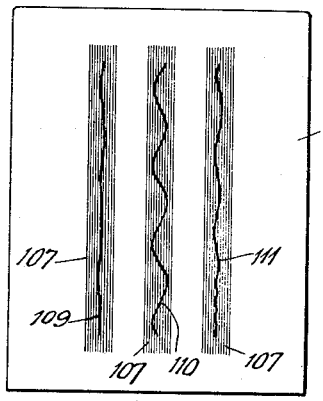
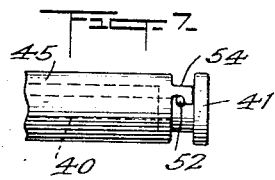
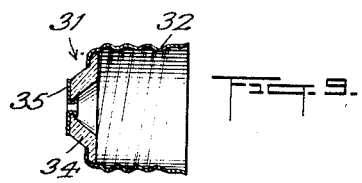
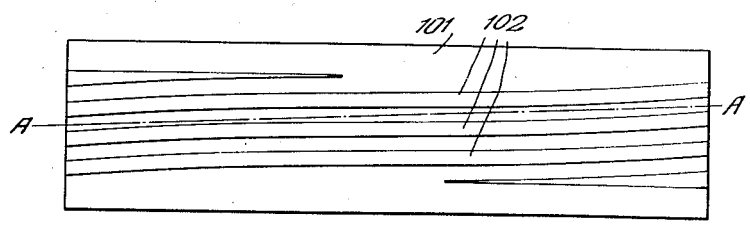

Patented Apr. 18, 1933

1,904,130

UNITED STATES PATENT OFFICE

PETER GARMS, OF NEW YORK, AND GEORGE LEWIS DIGGLES, OF FLUSHING, NEW YORK, ASSIGNORS TO ELECTRICAL TESTING LABORATORIES, OF NEW YORK, N. Y., A CORPORATION OF NEW YORK

THREAD TESTING AND RECORDING DEVICE

Application filed February 26, 1932. Serial No. 595,262.

The present invention relates to a device for testing the accuracy or inaccuracy of threads.

In the manufacture of screw shells or bases for electric lamps, the formation of the threads thereon is effected by a rolling process, which is employed because of the rapidity with which the threads may be formed. In this process a blank, in the form of a tube or thimble of thin material, is rolled between hardened cylindrical rolls or dies having registering threads or ridges, which cause adjacent alternate portions of the material to be indented and raised to form the desired spiral groove commonly referred to as a thread.

This rolling process, although rapid and economical, does not always produce an accurate thread. The blank is frequently caused to shift on the roll over which it is fitted, while the groove is being formed, and as a result, the continuous groove formed on the shell is not a true spiral, but assumes a sinuous path, deviating more or less to one side and to the other from a true spiral line, on the periphery of the shell. In a percentage of the threaded shells, these imperfections are so pronounced as to make it impossible to fit them into the lamp sockets in which it is intended to use them. For this reason it is desirable to test the shells prior to their being applied to the lamp bulbs.

An object of the present invention is to provide a testing device which will enable the operator to ascertain with precision and in a minimum amount of time the degree of accuracy or inaccuracy of threads formed on lamp base shells and their sockets, or like bodies.

Another object of the present invention is to provide a testing device of the character mentioned, which is simple in construction and will furnish a graphic representation or permanent record of the threads tested.

Further objects and advantages of the invention will become apparent from the following description taken in connection with the accompanying drawings, in which Fig. 1 is a view showing, partly in elevation and partly in section, one adaptation of this invention; Fig. 2 is a plan view thereof; Fig. 3 is an end elevation of the device as viewed from the right in Figs. 1 and 2; Fig. 4 is an enlarged fragmentary plan view of the device, particularly illustrating certain important parts of the device, some of these parts being shown in horizontal section for greater clarity; Fig. 5 is a fragmentary vertical cross-sectional view taken on the plane indicated by the line $5^x$—$5^x$ of Fig. 4; Fig. 6 is a cross-sectional view taken on the plane indicated by the line $6^x$—$6^x$ of Fig. 5; Fig. 7 is a fragmentary view of one of the clamping arbors in locked position on its housing; Fig. 8 is a view of a card having illustrated thereon actual records made by the device embodying the invention; Fig. 9 is a cross-section of an electric lamp base; and Fig. 10 is a diagram showing a development of the shell portion of such a lamp base.

The embodiment of the invention shown in the drawings comprises a T-shaped base 1, having mounted thereon a bearing-support or frame 2, as by screws 4. A horizontal shaft 5 is journalled in the bearing 2 and at its outer end is secured a crank-arm 6 having a handle 7. The inner end of the shaft 5 is journalled in another bearing support 9 secured to the base 1 as by screws 10. A sleeve or housing 11 is removably fitted into an opening formed through the support 2 and has a shoulder 12 adapted to abut the support to thereby properly position it longitudinally. A pair of thumb screws 14 serve to clamp the housing 11 rigidly in its operative position. At its outer end the sleeve 11 has a bearing for a shaft 15 having an inner collar 16 preventing its displacement in one direction, and carrying a gear 17 removably secured by a set-screw 19. As best seen in Fig. 3, the gear 17 meshes with a pinion 20, which may be fixedly secured to the shaft 5 by a set screw 21. The sleeve 11 also contains a sliding-arbor 24 provided with a screw 25 having the same lead as that standardized for the devices to be tested, which cooperates with an internal thread 26 formed in said sleeve 11. The arbor 24 is made tubular to receive the shaft 15 and a driving connection is effected by means of a pin 27 on the shaft which slides in a slot 28 in the arbor. This arrangement of parts locks the arbor 24 to the shaft 15 for rotary movement, but permits longitudinal displacement of the arbor 24 relative to the shaft 15. A rotation of the handle 7 causes a rotation of the shaft 15 through the intermediary of the gears 17 and 20, the member 24 rotating with the shaft 15 and being moved longitudinally of its axis by reason of its screw portion 26 rotating into the threaded portion 27 of the housing 11. The arbor 24 moves to the right of Fig. 1 when the handle 7 is rotated in a clockwise direction, and to the left of Fig. 1 when the handle 7 is rotated in a counter-clockwise direction.

Fig. 9 illustrates the usual construction of an electric lamp base 31 comprising a metallic threaded tubular shell 32 open at one end and having at the other end an inwardly directed flange which serves as a supporting means for an insulating closure or sealing composition 34. A perforated center conductive element 35 is carried by said composition and comprises a disc or exposed portion from which extends an inwardly directed stud embedded into said composition. This lamp b⌐ ͵e 31 is shown mounted in testing position ɪn the various illustrations, although it is understood that the shell proper 32, without the insulating medium 34 and center element 35, may likewise be mounted for test.

The arbor 24 is reduced in diameter at its outer end to provide a circular shoulder for a tubular chuck or work piece holder 36 which is removably secured by a pin 37 extending through said parts. The enlarged opening at the inner end portion of the holder 36 permits it to extend over the housing 11 when the arbor 24 is moved to the right in Fig. 1. The chuck 36 is also provided with a circular shoulder or seating ledge 39 to receive the open end or non-threaded margin of the shell 32, and with a circumferentially reduced portion to provide a clearance space for the body proper or threaded portion of said shell.

The lamp base 31 is firmly held in place on the chuck 36 by the clamping action of an arbor 40 having secured to its inner end a stud or head 41, which is caused to bear against the closed end of the lamp base 31 by the pressure exerted by a spring 42 acting against a collar 44 on said arbor 40. The spring 42 is housed within a sleeve 45 closed at its inner end and fitted at its outer end portion into a recess formed in a bearing support 46, secured by screws 47 to the base 1. The arbor 40 is longitudinally movable and rotatably mounted in the bearing portion of the support 46 and in the end wall 48 of the sleeve 45, and at its outer end carries a knurled stud 49, by means of which it may be pulled outwardly or retracted manually against the force of the spring 42, when positioning the lamp base on the chuck.

From the above description it becomes apparent that with the body to undergo study properly positioned between the clamping members 36 and 41, a rotation of the handle 7 causes both rotation and longitudinal displacement of said body. As will be more clearly understood hereinafter, the test requires that, for each complete revolution of the body, the latter be displaced in an axial direction exactly the distance of the theoretical lead of its threads, or the normal distance a nut would move forward on the threaded body if turned through one full revolution. This requirement is fulfilled by making the lead of the screw 25 and 26 equal to the standard or true lead of the threads undergoing study, or, in the case of threads of an electric lamp base, equal to the lead of the threaded rollers employed for producing the same. Tests on lamp bases or bodies having threads of different pitch are possible by simply substituting new threaded parts of proper pitch for the arbor 24 and sleeve 11. Preferably, a separate structure comprising the parts 11, 15, 24, 27, 36 and 37, properly assembled to one another, is provided for each particular pitch of threads to undergo study. To permit assembly and removal of such structure on and from the support 2, the support 46 is made in two parts 46a and 46b connected together by a bolt 50 and wing-nut 51. A loosening of the wing-nut 51 permits the upper part 46b to be swung or pivoted to one side to throw the arbor 40 out of alinement with the work piece holder 36. The gear 17 may then be removed from the shaft 15, the thumb screws 14 loosened, and the housing 11, together with all parts carried thereby, may be removed. The new structure is then mounted in the support 2, the thumb screws 14 tightened on the new housing 11, and the gear 17 replaced on the new shaft 15. The arbor 40 may then be swung back to its original position, the wing-nut 51 tightened, and the new body to undergo test clamped between the members 36 and 41.

Preferably, the head 41 carries a pin 52 and the housing 45 is provided at its inner end with an ear or hook 54 (see Figs. 2 and 7) adapted to receive the pin 52, whereby the arbor 40 may be retained in a retracted position against the force of the spring 42.

The shaft 5 carries at its inner end a bevel-gear 55, which meshes with a similar gear 56 carried by a screw-shaft 57. As more clearly illustrated in Fig. 3, the shaft 57 is rotatably supported at its end-portions in bearing supports 59 and 60, which are so positioned on the T-shaped base 1 as to cause said shaft 57 to be mounted at right-angles to the aforesaid shafts 5 and 15. The threaded portion 64 of the shaft 57 carries an interiorly threaded block 65, supporting a rectangular platform 66 having its longitudinal edges perpendicular to the axis of the clamping arbors 24 and 40. The platform 66 is maintained horizontal by slidably mounting the block 65 on a fixed guide 67, extending parallel to and beneath the screw-shaft 57 and rigidly secured at its ends by nuts 69 and 70 to the supports 59 and 60, respectively. Thus, it is seen that rotating the shaft 5 causes a rotation of the screw shaft 57 and a corresponding displacement of the block 65 and table 66. This displacement of the table 66 perpendicular to the axis of the body undergoing test occurs simultaneously with the rotation and axial displacement of said body. In the embodiment of the invention shown in the drawings, the threads on the shaft 57 and block 65 are right-handed threads, i. e. a clockwise rotation of the handle 7 causes the table 66 to move to the right in Fig. 3 and a counterclockwise rotation of the handle 7 causes the table 66 to move to the left.

The platform 66 is adapted to receive a paper card or rectangular record sheet 71, which will be hereinafter more particularly described. A suitable number of spring clamps 72 are pivotally mounted on the table 66, which also carries, at its inner end, a channel or groove forming strip 74. An end margin of the card 71 is inserted into this channel, the bottom of the latter, or the inner shoulder formed by the strip 74, acting as a stop for the inner end of the card for alining it on the table with its longitudinal edges parallel to the sides of said table. The spring members 72 are then swung into clamping position over the card.

A pair of upright posts 76 and 77, secured to the base 1 in any appropriate manner, are connected at their upper ends by a plate 79, which pivotally supports a horizontally movable stylus actuator or pencil-carrying mechanism illustrated in Fig. 5. This carrier includes an arm 81 held on a journal screw 82 and having a recessed or horizontally slotted rectangular block or housing 83 containing a longitudinally movable spring pressed plunger 84. The latter carries a tracer point or bead 85 which engages the thread on the object being tested and preferably engages the bottom of said thread. The end walls of the housing 83 are formed with alined openings in which the rod 84 is slidably mounted. A compression spring 86 disposed in the housing acts on a collar 87 fixed to the rod and normally projects it in a direction toward the work piece undergoing test and causes its extremity to follow or ride in the bottom of the groove therein, when the work piece is rotated. The simultaneous longitudinal displacement of the work piece will cause the extremity of the arm 81 to move laterally if the thread being tested is not a true spiral. The rod 84 is provided at its other end with a handle 88, by means of which the tracer bead 85 may be retracted against the force of the spring 86, as, for example, when it is desired to position a work piece to undergo study between the clamping members 36 and 41. Preferably, the rod 84 carries a pin 89 fitting in a slot or groove 90 formed on the inner surface of the opening in the end wall of the housing 83 nearest to the handle 88. A pull on the handle 88 will withdraw the pin 89 from its slot 90, so that a slight rotary movement will serve to lock the tracer plunger or rod 84 against the tension of the spring 86 and hold it in a retracted position. A stylus or pencil 99 is loosely mounted in the outer extremity of the arm 81, and a spring 100, fixed thereon and bearing against the upper end of the stylus 99, causes the latter to press against the underlying record card 71 on the table 66.

It now becomes apparent that, with the tracer or bead 85 properly engaging the groove of a lamp shell 32 and upon rotation of the handle 7, corresponding movements of said shell and of the card 71 will cause the stylus 99 to trace or draw a line record of said groove on the card. Should the threads on the shell be perfect, no pivotal movement of the recording device occurs, and the record drawn is a straight line. A perfect record, however, is almost never obtained when testing the type of threaded device described, by reason of the particular method of forming its threads, which is employed because it is both a cheap and rapid process. Referring to Fig. 10, 101 indicates the outer surface of a shell which has been severed and unrolled into a flat sheet, the threads thereon being indicated by 102. In this illustration, it is observed that, while the pitch of the threads 102, or the distance between any two consecutive threads, is substantially constant at different portions of the thread, still the angle at which the thread convolutions are formed is not uniform. In other words, the threads 102 with respect to the straight line A—A to which they would be parallel if perfect. The line A—A represents an imaginary developed true thread, its angularity to the axis of the shell being the true or theoretical helix angle of the threads 102. Such imperfect threads cause the bead 85 to oscillate in response to the sinuosity or imperfections of the thread, with the result that the pencil 99 draws a sinuous curve, such as the curve 105 shown on the card 71 in Fig. 2.

In Fig. 2 the handle 7 has been rotated in a clockwise direction to bring the head 85 from the right-hand end portion of the spiral groove on the shell 32 to the point where it is shown located in said groove, the curve 105 being the record drawn by the stylus 99 during the travel of the work piece beneath the bead 85. A continued rotation of the handle 7 will cause the shell to move to the right and the stylus 99 to draw the complete record of the groove. As a time saver, the test on the next shell or body to undergo study may be started at the left-hand end portion of its spiral groove, and successive tests alternately started at opposite end portions of the grooves tested. It is understood, however, that, if desired, the bead 85 may be inserted at the start of a test at any portion of the spiral groove and the handle 7 rotated first in one direction and then in the other, to cause the bead or tracer to engage all portions of the groove and the stylus 99 to consequently draw a record of the full length of said groove. Other records of grooves may be drawn on the same card 71, by properly shifting it on its support prior to each succeeding test. In Figs. 2 and 4, the curve 106 is a record of a threaded body which may have been tested prior to the body 31.

The stylus actuator is so mounted relatively to the bodies to undergo study, that, for a body having a theoretically perfect groove formed thereon and with the bead 85 engaging said groove, it will be caused to be maintained at right angles to the axis of the clamping arbors 24 and 40. It is to be particularly noted, however, that the stylus 99 is caused to trace a longitudinal record on the card 71, regardless of the angle at which the stylus actuator is set with said axis at the beginning of the test, and that the stylus 99 will produce a true or substantially perfect record of a groove, even with an appreciable angular deviation of the mean position of the arm 81 during test from a true perpendicular position.

Referring to Fig. 4, the record 106 is in the form of a sinusoidal curve. In each of its cycles there is a point "a" of maximum deviation from an imaginary straight line development of a perfect spiral thread to one side of said imaginary line, and in each of its cycles there is a point "b" of maximum deviation to the other side of said line. It is seen that the record 106 has a single cycle corresponding to each complete revolution of the threaded body having produced said record, this being generally the case in lamp base records. The distance between the two points "a" and "b" of maximum amplitude, measured perpendicularly to the longitudinal edges of the card, is an indication of the total error produced in forming the threads. If this distance is too great or exceeds a certain amount, the lamp base or body which has produced the record is unfit for use and discarded. Preferably, the card is provided with uniformly spaced longitudinal lines 107 over which a record may be drawn, so that the error in the threads may be calculated by counting the number of lines or spaces between the two points "a" and "b" of maximum amplitude. If desired, the lines 107 may be calibrated in degrees of percentage deviations from the true or theoretical helix angle. Several groups of lines 107, to receive a corresponding number of records, may be printed on each card.

The device, besides recording deviations in a spiral thread from its true helix angle, will record other imperfections, such as a marred or mutilated portion of the thread caused, for example, by a blow thereon or jamming on some machine part during the process of manufacture.

Referring to Fig. 8, the curves 109, 110 and 111 on the card 112 are reproductions of actual records made of three different lamp bases. Curve 109 shows an unmarred spiral thread having a substantially uniform and true helix angle. Curve 110 shows an abnormal but continuously curved thread deviating considerably from the theoretical helix angle. Curve 111 shows a thread which, while not departing considerably from the theoretical helix angle, has marred portions or abrupt irregularities, which may have been caused by improper handling or sudden shifting of the blank during the thread rolling process.

It is understood that the embodiment of the invention shown in the drawings and described herein is subject to various modifications without departing from the spirit of the invention and the scope of the following claims.

What is claimed is:

1. A thread testing and recording device comprising means for rotating a threaded body to undergo test and simultaneously proportionately displacing it axially the distance of the theoretical lead of its spiral thread during each complete revolution thereof, a record sheet, a pivoted recording mechanism having a stylus engaging said sheet and an element adapted to be guided by said thread during said movements of said body, and means for moving said record sheet transversely to the axis of rotation of said body simultaneously and proportionately with said movements of said body to cause said stylus to trace a line record of said thread on said sheet.

2. A thread testing and recording device comprising two clamping members between which a threaded body to undergo test may be removably mounted, means for rotating said members with the body there-between and for simultaneously proportionately displacing the same along their axis the distance of the theoretical lead of said body's spiral thread for each full revolution of said body, a pivoted recording mechanism having a stylus at one end and an element at the other adapted to be guided by said thread, a table adapted to receive a record-sheet on which said stylus is adapted to bear, and means for displacing said table perpendicularly to the axis of the clamping members simultaneously and proportionately with their combined movements to cause the stylus to produce a line record of said thread.

3. A thread testing and recording device comprising a member adapted to receive a threaded body to undergo test, a rotatable and longitudinally yielding clamp securing the body on said member, means for rotating said member and simultaneously proportionately displacing it axially the theoretical lead of the spiral groove on said body during each full revolution of the latter, a recording device pivoted intermediate its ends and having a stylus at one end and a yieldingly mounted element at the other adapted to bear against said groove, a record-sheet on which said stylus is adapted to bear, and means for displacing said record-sheet simultaneously and proportionately with the rotation and axial displacement of said body to cause said stylus to draw a line record of said groove on said record sheet.

4. A thread testing and recording device comprising a holder adapted to receive a threaded body to undergo test, means including a screw for rotating said holder and body and for simultaneously proportionately displacing the same axially the theoretical lead of the spiral groove on said body during each full revolution thereof, a second screw mounted perpendicularly to the axis of said holder, a platform carried by said second screw and moved thereby toward and from the holder, a record-sheet carried by the platform, means common to both screws for rotating them in synchronism with one another, and a pivoted arm having a portion adapted to follow said groove and another portion carrying a stylus for producing a continuous record of said groove on said sheet.

5. A thread testing and recording device comprising means for rotating a threaded body undergoing test and for simultaneously proportionately displacing said body axially the distance of the theoretical lead of its spiral groove during each complete revolution thereof, a record-sheet having uniformly spaced parallel lines thereon, a pivoted recording mechanism having a stylus engaging said sheet within the area of said lines and a tracer adapted to follow said groove, means for displacing said sheet simultaneously and proportionately with said movements of said body to cause the stylus to produce a continuous line record of said groove longitudinally of said parallel lines.

6. A thread testing and recording device comprising a support, an interiorly threaded sleeve carried by said support, a shaft rotatable within said sleeve, a screw member rotatable with and longitudinally movable on said shaft and co-operating with said threaded sleeve, said member having a portion extending beyond said sleeve adapted to carry a threaded body to undergo test, the threads of said sleeve and member having a lead equal to the theoretical lead of the spiral groove on said body; said sleeve, shaft and member being removable as a unit from said support; means for rotating said shaft, a record sheet, a pivoted recording mechanism having a stylus engaging said sheet and an end portion adapted to follow said spiral groove during rotation and simultaneous axial displacement of said body, and means for displacing said sheet transversely to the axis of rotation of said shaft simultaneously and proportionately with the rotation of said shaft to cause said stylus to trace a line record of said spiral groove in said sheet.

7. A thread testing and recording device comprising a support, an interiorly threaded sleeve carried by said support, a shaft rotatable within said sleeve, a screw member rotatable with and longitudinally movable on said shaft and cooperating with said threaded sleeve, said member having a portion extending beyond said sleeve adapted to receive a threaded body to undergo test, the threads of said sleeve and member having a lead equal to the theoretical lead of the spiral groove on said body; said sleeve, shaft and member being removable as a unit from said support; means for rotating said shaft, a rotatable and longitudinally yieldable clamping element for securing said body on said member during its rotation and simultaneous axial displacement, a record sheet, a pivoted recording mechanism having a stylus engaging said sheet and an end portion adapted to follow said spiral groove during rotation and simultaneous axial displacement of said body, and means for displacing said sheet transversely to the axis of rotation of said body simultaneously and proportionately with the rotation of said shaft to cause said stylus to trace a continuous line record of said spiral thread on said sheet.

8. A thread testing and recording device comprising a support, an interiorly threaded sleeve carried by said support, a shaft rotatable within said sleeve, a screw member rotatable with and longitudinally movable on said shaft and cooperating with said threaded sleeve, said member having a portion extending beyond said sleeve adapted to receive a threaded body to undergo test, the threads of said sleeve and member having a lead equal to the theoretical lead of the spiral groove on said body; said sleeve, shaft and member being removable as a unit from said support; a rotatable and longitudinally yieldable clamping element for securing said body on said member, a pivotal mounting for said element permitting it to be swung out of axial alignment with said member, a record sheet movable transversely to the axis of said body, a pivoted recording mechanism having a stylus adapted to engage said sheet and an end portion adapted to engage said spiral groove, and means for rotating said shaft and for displacing said sheet in synchronism with the rotation of said shaft to cause said stylus to trace a line record of said spiral groove on said sheet.

9. A device for producing a line record of the spiral groove formed on an incandescent lamp base comprising a chuck for receiving said base and a rotatable and longitudinally yieldable clamp in axial alignment with said chuck for removably holding said base on said chuck, means including a screw for rotating said chuck and for simultaneously proportionately displacing it axially the theoretical lead of said spiral groove during each full revolution thereof, a second screw mounted perpendicularly to the axis of said first chuck, a platform carried by said second screw to be moved thereby toward and from the axis of said chuck, a record-sheet on said platform, means common to both screws for rotating them in synchronism with one another, and pivoted recording means having a tracer adapted to follow said groove and a stylus for producing the line record of said groove on said sheet.

In testimony whereof, we have signed this specification.

PETER GARMS.
GEORGE LEWIS DIGGLES.